United States Patent Office 3,584,086
Patented June 8, 1971

3,584,086
PROCESS FOR PREPARING DIALKYL 1-(2,4,5-TRI-CHLOROPHENYL)-2-CHLOROVINYL PHOSPHATES
David E. Ramey, Modesto, Calif., assignor to Shell Oil Company, New York, N.Y.
No Drawing. Filed Sept. 5, 1968, Ser. No. 757,766
Int. Cl. C07f 9/12; A01n 9/36
U.S. Cl. 260—969
5 Claims

ABSTRACT OF THE DISCLOSURE

Insecticidally active dialkyl 1-(2,4,5-trichlorophenyl)-2-chlorovinyl phosphates are prepared by the reaction of a trialkyl phosphite with a 2,4,5-trichloro-α-(dichloromethyl)-α-alkoxybenzyl alcohol.

BACKGROUND OF THE INVENTION

Field of the invention

This invention relates to a process of preparing dialkyl 1-(2,4,5-trichlorophenyl)-2-chlorovinyl phosphates.

Description of the prior art

U.S. 3,102,842 describes a process for preparing insecticidally active dialkyl 1-(2,4,5-trichlorophenyl)-2-chlorovinyl phosphates by reacting 2,2,2',4',5'-pentachloroacetophenone and trialkyl phosphites. In the preparation of the intermediate 2,2,2',4',5'-pentachloroacetophenone by reaction of 1,2,4-trichlorobenzene with dichloroacetyl chloride and aluminum trichloride, substantial amounts of other pentachloroacetophenones are formed.

The presence of the 2,2,2',3',6'-isomer is highly undesirable as it also reacts with the trialkyl phosphite to form dialkyl 1-(2,3,6-trichlorophenyl)-2-chlorovinyl phosphates which generally have much less insecticidal activity than the 2,4,5-trichlorophenyl isomers. More importantly, however, these dialkyl 1-(2,3,6-trichlorophenyl)-2-chlorovinyl phosphates and their acetophenone precursor exhibit a hormonal activity to broad leaf plants, so that their presence in appreciable amounts limits the use of the more highly insecticidal dialkyl 1-(2,4,5-trichlorophenyl)-2-chlorovinyl phosphates.

One solution to this problem of isomeric impurities in the dialkyl 1 - (2,4,5 - trichlorophenyl) - 2 - chlorovinyl phosphates is described and claimed in copending Ser. No. 575,765, filed Sept. 5, 1968 entitled "Separation of Pentachloroacetophenone Isomers" by Joseph W. Sims, filed on even date herewith. This solution involves selectively removing the 2,2,2',4',5'-pentachloroacetophenone from an isomeric mixture also containing the 2,2,2',3',6'-isomer via the crystalline lower alkanol hemiketal of the 2,2,2',4',5'-isomer. When an isomeric mixture of pentachloroacetophenones containing the 2,2,2',4',5'- and 2,2,2',3',6'-isomers is treated in liquid phase with an alkanol in the presence of a mineral acid such as sulfuric acid, the 2,2,2',4',5'-isomer forms a hemiketal (a 2,4,5-trichloro - α - (dichloromethyl) - α - alkoxybenzyl alcohol), while the 2,2,2,3',6'-isomer does not. This hemiketal is recovered by selectively crystallizing it from the solution; it can then be reconverted to highly pure 2,2,2',4',5'-pentachloroacetophenone by conventional methods, e.g., heating under vacuum. While this is a convenient method for obtaining highly pure 2,2,2',4',5'-pentachloroacetophenone, it involves the additional process step of regenerating the acetophenone.

SUMMARY OF THE INVENTION

I have found a novel and convenient method for preparing dialkyl 1 - (2,4,5 - trichlorophenyl)-2-chlorovinyl phosphates in high yield and high purity, free from the undesirable 2,3,6-trichlorophenyl isomer or its acetophenone precursor. Surprisingly, it has been discovered that the 2,2,2',4',5'-pentachloroacetophenone does not need to be regenerated from its alkanol hemiketal for toxification with a trialkyl phosphite, as described above. The alkanol hemiketal can be directly toxified with the trialkyl phosphite, thus eliminating the regeneration step.

Accordingly, this invention is directed to a method of preparing dialkyl 1-(2,4,5-trichlorophenyl)-2-chlorovinyl phosphates by reacting a trialkyl phosphite with a 2,4,5-trichloro-α-(dichloromethyl)-α-alkoxybenzyl alcohol.

DESCRIPTION OF THE PREFERRED EMBODIMENTS

The dialkyl 1 - (2,4,5 - trichlorophenyl)-2-chlorovinyl phosphates prepared by the method of this invention may be described by the formula $$\begin{array}{c} RO \\ \phantom{RO} \diagdown \\ \phantom{RO} \phantom{\diagdown} P-O-C \\ R'O \diagup \end{array} \begin{array}{c} CHCl \\ \| \\ \end{array} \begin{array}{c} Cl \\ \diagup \phantom{|} \diagdown \\ \phantom{\diagup} \phantom{|} \phantom{\diagdown} -Cl \\ \diagdown \phantom{|} \diagup \\ Cl \end{array}$$

wherein R and R', which may be the same or different, are alkyl, suitably of 1–10 carbon atoms, preferably 1–4 carbons each. The alkyls may be of straight or branched-chain configuration.

The trialkyl phosphite reactants of this process are well known in the art and can be described by the formula $$\begin{array}{c} OR^1 \\ | \\ RO-P-OR^2 \end{array}$$

where R, $R^1$ and $R^2$, which may be the same or different, are alkyls, suitably of 1–10 carbon atoms, preferably 1–4 carbon atoms and include such members as methyl ethyl, propyl, isopropyl, butyl, pentyl, hexyl, octyl, decyl and the like. Examples of the trialkyl phosphites include trimethyl phosphite, triethyl phosphite, tripropyl phosphite, tributyl phosphite, methyl ethyl propyl phosphite, tripentyl phosphite, tridecyl phosphite and the like.

The 2,4,5-trichloro-α - (dichloromethyl) - α - alkoxybenzyl alcohol reactants used in the process of this invention can be described by the formula $$\begin{array}{c} Cl \diagup \phantom{|} \diagdown \\ \phantom{Cl} \phantom{\diagup} \phantom{|} \phantom{\diagdown} \\ Cl \diagdown \phantom{|} \diagup \\ \phantom{Cl} \phantom{\diagdown} \phantom{|} \phantom{\diagup} \\ Cl \end{array} \begin{array}{c} OR^3 \\ | \\ C CHCl_2 \\ | \\ OH \end{array}$$

where $R^3$ is alkyl, suitably of 1–6 carbon atoms, preferably 1–4 carbon atoms, and include such members as methyl, ethyl, propyl, isopropyl, butyl, isobutyl, pentyl, hexyl and the like.

Typical examples of these benzyl alcohols are:

2,4,5-trichloro-α-(dichloromethyl)-α-methoxybenzyl alcohol
2,4,5-trichloro-α-(dichloromethyl)-α-ethoxybenzyl alcohol
2,4,5-trichloro-α-(dichloromethyl)-α-propoxybenzyl alcohol
2,4,5-trichloro-α-(dichloromethyl)-α-isobutoxybenzyl alcohol
2,4,5-trichloro-α-(dichloromethyl)-α-butoxybenzyl alcohol
2,4,5-trichloro-α-(dichloromethyl)-α-pentyloxybenzyl alcohol
2,4,5-trichloro-α-(dichloromethyl-α-hexyloxybenzyl alcohol and the like.

The novel reaction of this invention can be caried out simply by mixing the selected reactants and thereafter maintaining the reaction mixture at reaction temperatures. The selection of the trialkyl phosphite determines the alkyl moieties, i.e., R and R', of the dialkyl 1-(2,4,5-trichlorophenyl)-2-chlorovinyl phosphate. Thus, using trimethyl phosphite with any of the 2,4,5-trichloro-α-(dichloromethyl)-α-alkoxybenzyl alcohols yields the dimethyl species of the chlorovinyl phosphate. It is preferable, however, to use the benzyl alcohol having the same alkoxy moiety as is present on the trialkyl phosphite, i.e. R, R$^1$, R$^2$ and R$^3$ are the same alkyl. Suitable reaction temperature range from about 25° C. to about 150° C. preferably from about 50° C. to about 110° C.

The reaction is exothermic and in some cases, may tend to be violent. The reaction can be controlled and the temperature maintained at the desired level by slowly adding one of the reactants to the other or by employing an inert diluent or solvent such as a hydrocarbon solvent or an ethereal solvent. Suitable examples, of these solvents include pentane, nonane, decane, benzene, toluene, mesitylene, diethyl ether, diisopropyl ether and the like.

The reactants are usually employed in about equimolar quantities, preferably with a slight molar excess of the trialkyl phosphite. Broadly, however, mole ratios of hemiketal to trialkyl phosphate of 10:1 to 1:10, are applicable with mole ratios of 2:1 to 1:2 being generally satisfactory.

The dialkyl 1-(2,4,5-tricholorphenyl)-2-chlorovinyl phosphate may be recovered from the reaction mixture by conventional techniques such as distillation, extraction with selective solvents, crystallization and the like.

The 2,4,5-trichloro-α-(dischloromethyl)-α-alkoxybenzyl alcohols may be prepared from isomeric mixtures containing the 2,2,2',4',5'-isomer as previously described or by similar techniques using pure 2,2,2',4',5'-pentachloroacetophenone to form the alkanol hemiketal.

The dialkyl 1-(2,4,5-trichlorophenyl)-2-chlorovinyl phosphates are active insecticides as described in U.S. 3,102,842 and U.S. 2,956,073. The process of this invention is especially useful for preparing the highly insecticidal dimethyl 1-(2,4,5-trichlorophenyl)-2-chlorovinyl phosphate, preferably by reaction of 2,4,5-trichloro-α-methoxybenzyl alcohol with trimethyl phosphate. This is a preferred aspect of the invention.

The process of the invention is illustrated by the following example.

EXAMPLE

Preparation of dimethyl 1-(2,4,5-trichlorophenyl)-2-chlorovinyl phosphate

To 32.5 grams (0.10 mole) of 2,4,5-trichloro-α-(dichloromethyl)-α-methoxybenzyl alcohol was added over fifteen minutes, 13.6 grams (0.11 mole) of trimethyl phosphite. The temperature was kept between 60° C. to 85° C. during the mixing. After the addition was complete, the mixture was heated to 90–100° C. for 2.5 hours. The light amber residue was stirred with hexane (57 milliliters) at 25° C., filtered, and washed with hexane (30 milliliters) to yield 32 grams of dimethyl 1-(2,4,5-trichlorophenyl)-2-chlorovinyl phosphate, melting point 94–96° C. The yield was 87% molar with a purity of 99% by weight. The identity of the product was confirmed by infrared and gas-liquid chromatographic analysis.

I claim as my invention:

1. A process of preparing a dialkyl 1-(2,4,5-trichlorophenyl)-2-chlorovinyl phosphate, wherein the alkyl groups are the same or different and each contains one to ten carbon atoms, comprising reacting at 50° C. to 110° C. a trialkyl phosphite wherein the alkyl groups are the same or different and each contains one to ten carbon atoms, with a 2,4,5-trichloro-α-(dichloromethyl)-α-alkoxybenzyl alcohol wherein the alkoxy group contains one to six carbon atoms.

2. The process of claim 1 wherein each of said alkyl moieties has from from 1–4 carbon atoms and said alkoxy is of 1–4 carbon atoms.

3. The process of claim 2 wherein the trialkyl phosphite is trimethyl phosphite.

4. The process of claim 2 wherein the alkoxy is methoxy.

5. The process of claim 4 wherein the trialkyl phosphite is trimethyl phosphite and the phosphate prepared is dimethyl 1-(2,4,5-trichlorophenyl-)-2-chlorovinyl phosphate.

References Cited

UNITED STATES PATENTS 3,102,842   9/1963   Phillips et al. _____ 260—969X

OTHER REFERENCES

Kirk-Othmer, "Encyclopedia of Chemical Technogoy," 2nd edition, vol. 1, Interscience Publishers, New York, (1963), p. 108.

CHARLES B. PARKER, Primary Examiner

A. H. SUTTO, Assistant Examiner

U.S. Cl. X.R.

260—615, 957; 424—219